United States Patent [19]
Remis et al.

[11] Patent Number: 5,842,644
[45] Date of Patent: Dec. 1, 1998

[54] AUTOMOBILE SECURITY DEVICE

[76] Inventors: C. Steve Remis, 5799 S. Gallup St.;
Maurice J. Marcas, 6823 S. Cherry St., both of Littleton, Colo. 80120;
George J. MacDonald, 9818 E. Ida Cir., Englewood, Colo. 80111

[21] Appl. No.: 608,575

[22] Filed: Feb. 28, 1996

Related U.S. Application Data

[63] Continuation-in-part of Ser. No. 264,786, Jun. 23, 1994, abandoned.

[51] Int. Cl.⁶ ..................................................... B60R 21/12
[52] U.S. Cl. ............................................................. 239/289
[58] Field of Search ............................... 239/284.1, 289, 239/172; 222/150, 3, 175; 340/427, 573

[56] References Cited

U.S. PATENT DOCUMENTS

| | | | |
|---|---|---|---|
| 3,213,493 | 10/1965 | Chichester | 239/284.1 X |
| 3,433,416 | 3/1969 | Bauer et al. | 239/587.4 |
| 3,635,372 | 1/1972 | Van Dyck et al. | 222/3 |
| 4,618,096 | 10/1986 | Kondo et al. | 239/101 |
| 5,318,147 | 6/1994 | Maifski | 180/287 |

FOREIGN PATENT DOCUMENTS 451729  8/1936  United Kingdom .

*Primary Examiner*—Kevin Weldon
*Attorney, Agent, or Firm*—Lee G. Meyer

[57] ABSTRACT

An installed vehicle security system having at least one multidirectional atomizing nozzle positioned on the vehicle adjacent a target zone. A disabling fluid is held in a pressurized canister in fluid communication with the nozzles. Foot and hand triggers, including remote triggers, are provided for releasing an amount of disabling fluid from the nozzles effective to saturate the target area. The canister is under constant pressure, independent of the vehicle's engine; the triggers are powered independently of the vehicle's ignition system; and the nozzles are pre-positioned so that the security system of this invention is constantly ready for rapid and unobtrusive actuation. A detachable vehicle security system is also provided.

5 Claims, 4 Drawing Sheets

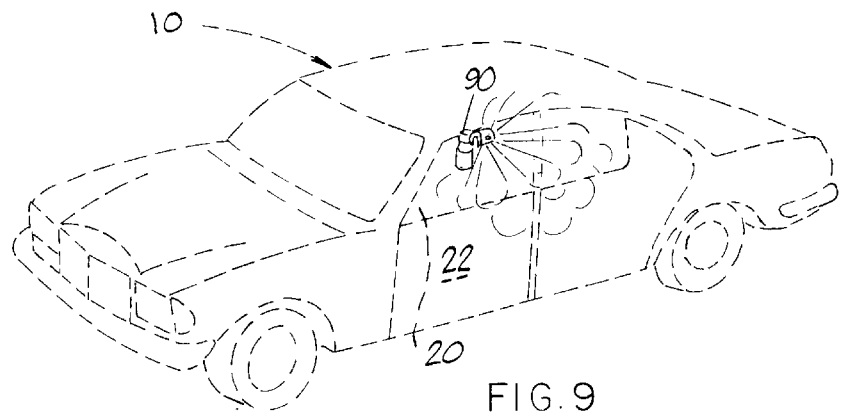
FIG. 9
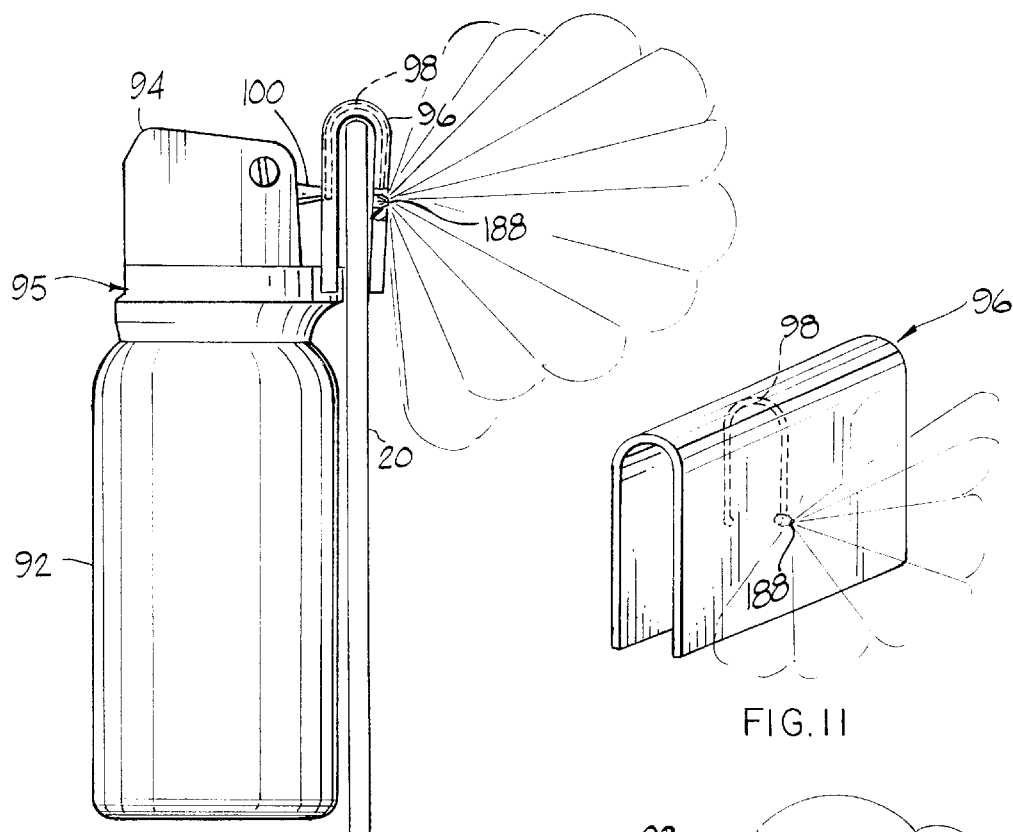
FIG. 10
FIG. 11
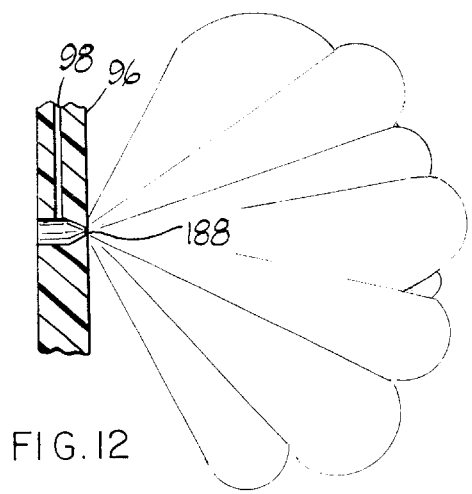
FIG. 12

AUTOMOBILE SECURITY DEVICE

The present application is a Continuation-in-Part of application Ser. No. 08/264,786 filed Jun. 23, 1994, for an Automobile Security Device now abandoned. The parent application, which is incorporated by reference in its entirety, discloses an automobile security device which enables the driver of the vehicle to spray disabling fluid at a person trying to enter the vehicle.

BACKGROUND OF THE INVENTION

The instant invention relates to deterrent type vehicle security systems and devices and methods for securing a vehicle, and more particularly to systems and devices that enable the driver to deliver an effective amount of disabling fluid into a target area proximate the vehicle to disable or incapacitate a person trying to enter the occupied vehicle. The invention has particular utility for preventing "car jackings" and similar crimes against persons occupying an automobile.

1. Field of the Invention

Within the last number of years, there have been reports of an increasing number of car jackings, a crime in which a vehicle is stolen while occupied. A criminal may approach a car that is stopped at a traffic light or elsewhere, open the driver's door, and force the driver out of the vehicle. Such crimes, or other crimes against the person or property of the driver, may also be perpetrated in parking lots as the occupant of the vehicle is seated in the driver's seat prior to starting the engine or driving away. In certain notorious incidents, the crimes have been accompanied by violence and even death.

There are a number of hand held units available on the market which project a stream of disabling fluid at an attacker. The draw backs to these devices are that one must be face to face with an attacker, and have presence of mind to aim and fire. In addition, a vehicle occupant must roll down the vehicle window to use these devices, subjecting the occupant to face to face confrontation with the attacker.

Thus a proactive security system which allows the occupant to deliver an effective amount of a disabling liquid to a target area proximate the vehicle without having to aim the dispensing device, and without requiring the occupant to be face to face with the assailant would be desirable.

2. Description of Related Art

U.S. Pat. No. 627,693 of Howarth shows a bicycle security system having a number of boxes containing snuff, pepper, or like material. The boxes are secured to the bicycle frame and a compressible bulb operated by the bicycle rider forces air through a connecting tube to the boxes for spraying the contents of the boxes outward to repel vicious dogs.

U.S. Pat. No. 2,114,558 of Dismukes and U.S. Pat. No. 4,618,096 of Kondo et al. disclose conventional windshield washer systems that direct a spray jet of cleaner towards the windshield of a vehicle. The washer system of Dismukes comprises a reservoir holding a cleaning liquid, a nozzle for discharging the fluid onto the windshield, a discharge line connecting the reservoir and the nozzle, a pressurizing mechanism for putting the cleaning liquid under pressure, and a control valve operable by the driver of the vehicle. Dismukes discloses that the system may be pressurized by a mechanical pump operated by the engine, by a hand pump, by exhaust pressure from the engine's manifold, or by fitting the tank with a pneumatic valve and storing and replenishing air pressure from a service station.

The windshield washer system of Kondo et al. has a fluidic oscillator type nozzle for directing a washer fluid from a storage tank and onto a vehicle windshield by way of a pressure pump with periodically changing pressure for deflecting the jetting direction of the washer liquid horizontally and vertically.

U.S. Pat. No. 2,009,026 of Searle describes a protective device for automobiles. The protective device provides a set of spot lights mounted outside the vehicle and capable of being shifted by hand. The spots are fitted with spray nozzles connected to a coloring dye and to an acid or other chemical for directing rays of light at, while simultaneously marking or disabling, a holdup man. The spot lights are adjustably mounted outside the vehicle. A nozzle is carried in the lower part of each spot light. The nozzles are attached to two hoses, one connected to a pressurized tank containing a coloring dye, and the other connected to a pressurized tank containing a tear gas, an acid, or other strong chemical. The tanks are pressurized by compression from the motor of the vehicle. The vehicle occupant aims the spot light by hand, selects the tank, and releases the contents by way of a pedal activated trigger. The drawbacks of this system are twofold. First, the occupant must "aim" the spotlights in order to direct the stream of repellant/dye on the attacker. The attacker can duck or otherwise avoid the stream. Second, the pressurization mechanism is actuated by the motor, which means that the system is inoperative when the engine is not running.

Thus, a principal disadvantage of security systems like that shown in the patent of Searle is that, in today's somewhat more violent and methodical criminal incidents, there is not enough time to work them. That is, a system that is aimed by hand, triggered by a combination of steps, and/or pressurized by engine power only, may offer some theoretical safety, but no practical help when a more rapid response is required.

United States patent No. of Maiefski describes a device having a single nozzle mounted adjacent a driver' doors for directing a spray of disabling liquid or gas in the direction of the face of an attacker. Maiefski also discloses that a single nozzle can be positioned on the passengers door.

The primary object of the disclosed invention in Maiefski is to aim a nozzle to direct a spray at an attackers face. The nozzle that is described is a "forward spray" device which must be positioned to "aim" the spray in the direction of the attacker. Again, the primary problem with this type of device is that it must be aimed at the attacker thus allowing the attacker to duck under the spay or otherwise avoid it. Even nozzles that swivel, as shown in U.S. Pat. No. 3,433,416, do not solve the problem of a directed spray, such as that emitted by hand held units, which can be avoided. Further, nozzles which produce a gas or a mist of material may not be effective in transferring sufficient disabling fluid to the person of the attacker to actually disable him/her.

It can be seen that there is still a need for an automobile security system adapted to the prevention of the potentially violent crimes that have been reported in the last few years. In accordance with the present invention there is provided a more advantageous system for atomizing an amount of incapacitating or disabling fluid effective to engulf or saturate a target area, to prevent an intruder outside the vehicle from gaining access to the vehicle without passing through the engulfed target area while triggering the system rapidly and unobtrusively, and pressurizing and powering the system at all times so that it is immediately available.

These, and other advantages of this invention will become more clear in the following description and discussion.

SUMMARY OF THE INVENTION

The automobile security system of this invention is intended primarily to protect occupant(s) of an automobile against an assailant who is outside the vehicle and who is attempting to enter from either the driver's or passenger's door, or who is threatening the occupants from an area adjacent the doors. The occupants of the vehicle are able to fire a multidirectional, atomized amount of an incapacitating or disabling fluid effective to saturate a target area adjacent the vehicle. The atomized mist is of sufficient quantity to be effective in preventing the assailant from dodging or avoiding contact with the fluid. The repulsion is accomplished with a rapid, one-step trigger operation. The system is under constant pressure and is available for use even when the automobile engine is shut off.

In the broad aspect of the invention there is provided at least one multi directional, atomizing nozzle means mounted adjacent a target area on the exterior of a vehicle for saturating the target area with an amount of a disabling fluid effective to prevent an assailant from avoiding the disabling fluid, a source of disabling fluid, and means for delivering a selected quantity of said fluid to said nozzle. In a preferred embodiment there is further provided a remote control means for initiating the dispensing of said fluid through said nozzle. In a greatly preferred embodiment there are provided at least two multidirectional nozzle mean which cooperate to provide an overlapping pattern of atomized material to more effectively saturate the target area.

In one aspect of the invention the system can be permanently installed in an automobile in another the device is detachable. A significant secondary ability of the installed system of the invention is that the system can be activated remotely from outside the vehicle. Thus, in the case where a vehicle owner is approaching his or her car and notices someone trying to break into the (unoccupied) vehicle or loitering suspiciously by the car, he or she may activate the system, and disable the wrongdoer before the owner is in danger.

This invention includes as the source of disabling fluid at least one pressurized canister holding the fluid. In a preferred embodiment, nozzles are located at or near at least two points on the side of the car by the driver's door and/or the passenger's door and are connected to the canister by hoses. A trigger activates a release to atomize a saturating amount of the disabling solution to a target area through the multi-directional nozzles.

In accordance with the invention, the multi-directional nozzles are predisposed proximate a target area adjacent the vehicle where an assailant is expected to be standing. It is anticipated that a carjacker, a person trying to break into the car, and many other assailants would have to enter this target area for the purpose of their intended crime. In a preferred embodiment, there are at least two nozzles affixed proximate the target area positioned such that they act in cooperation to produce an overlapping saturated zone. In one embodiment the nozzles are mounted on the side of the car by the driver's door and/or the passenger's door, with a first nozzle located on or near the door and a second nozzle located at a cooperative distance from the first nozzle. The nozzles are so situated such that material emitted from the first nozzle and the second nozzle cover and saturate the target area adjacent the vehicle. In another embodiment, the nozzles will oscillate or swivel under fluid pressure according to a self-fluidic design to further assure saturation of the target area with atomized material. In still another embodiment remote control means is provided for initiating the dispensing of said fluid through said nozzle. In accordance with the removable or detachable embodiment, there is provided at least one multi-directional nozzle mounted exterior to the vehicle adjacent a target area for saturating the target area with atomized disabling fluid in an amount effective to prevent an assailant from avoiding the disabling fluid; a source of disabling fluid interior of the vehicle; and a conduit/support means for connecting the source of fluid on the interior of the car and the nozzle exterior to the vehicle; and providing a support for the detachable system. In a preferred embodiment there is further provided a "u" shaped support bracket for removably mounting the detachable system on a rolled up vehicle window, said bracket contains an embedded channel which provides the conduit for delivering the fluid from the source located inside the vehicle to the nozzle located outside the vehicle. In a greatly preferred embodiment there are provided at least two multidirectional nozzle mean which cooperate to provide an overlapping atomized pattern of disabling fluid to more effectively saturate the target area.

The preferred disabling fluid reservoirs are canisters which are pre-pressurized. Since they are under pressure at all times, they do not require any time to charge, as is required when using the vehicle's motor or a hand pump. The canisters are ready for discharge at all times and pressure is always immediately available.

The trigger is, in the permanently attached preferred embodiment, actually at least two independent triggers. A first trigger is foot actuated, and may be a foot switch located out of sight on the floor of the vehicle. A second trigger is hand actuated, and may be lodged in a remote unit having a transmitter and may be kept in the vehicle operator's pocket, purse, or key chain (yet another trigger could be located conveniently within the vehicle accessible to the hand, as in the dashboard, console, or elsewhere).

When actuated the trigger will, in a preferred embodiment, direct an electrical current to a solenoid, releasing the pressurized fluid from the canisters to the nozzles. The electrical current is independent of the ignition switch. The foot trigger (and any other in-vehicle trigger) draws power directly from the vehicle's battery. The remote, hand actuated trigger draws power from its own battery.

In the detachable embodiment, the trigger is manually actuated by the occupant of the vehicle. Preferably, the trigger employs a safety mechanism so that the device is not inadvertently fired. In a preferred embodiment, the trigger, once depressed, expels all the material in the reservoir to allow the occupant to use both hands to operate the vehicle for a "get away."

In various configurations, the system of this invention may include multiple canister and nozzle sets, with one set proximate the driver's (left side) door and the other set proximate the passenger's (right side) door. In such configurations of the installed unit, a selector switch may be provided to select the left and/or right canister and nozzle sets so as to spray disabling jet(s) from either the left door, the right door, or both doors.

The chemical composition of the disabling fluid may, of course, be selected based upon the best nonlethal formulations available. The system of this invention has been tested with a mixture of 10% oleoresin capsicum solution, 5% propylene glycol USP, 35% specially denatured alcohol 40B, and 50% distilled water.

This combination of features permits the security system of this invention to be pre-positioned toward the region whence the threat is most likely to come, to be rapidly actuated in a one-step and unobtrusive manner with alternate hand or foot triggers, and to be always pressurized and powered for immediate use in any unexpected situation.

DESCRIPTION OF THE DRAWINGS

FIG. 9 is a perspective view of the detachable system of this invention as it is removably positioned on a vehicle.

FIG. 10 is a side view of the detachable system of FIG. 9 as mounted on a vehicle's closed window.

FIG. 11 is a perspective view of the mounting clip of FIG. 10 showing the embedded fluid channel.

FIG. 12 is a cutaway side view of the mounting clip of FIG. 11 showing the communication of the fluid channel and the multi-directional nozzle.

DETAILED DESCRIPTION OF THE INVENTION

Figure 1:
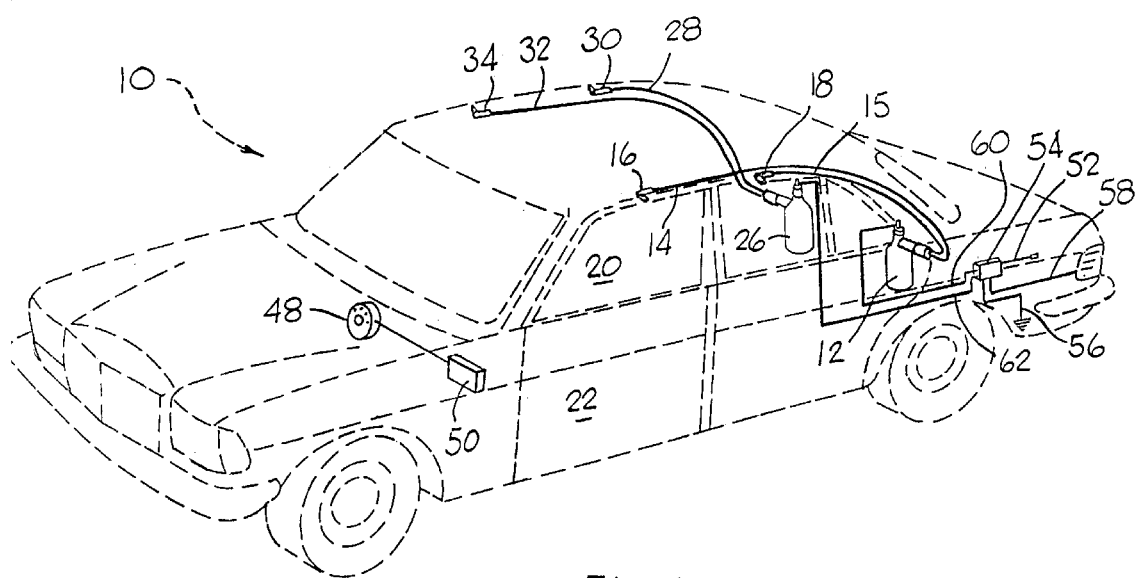
FIG. 1 is a perspective, partial cutaway, view of an embodiment of the installed system of this invention.

With reference to FIG. 1, it may be seen that the installed system of this invention fits a vehicle 10 with at least one pressurized canister 12, connected by hoses 14, 15 to a pair of nozzles 16, 18 carried near window 20 of the driver's door 22. Multi-directional nozzle 16 is located at or near the top of window 20 and multi-directional nozzle 18 is located at a distance from nozzle 16, and is shown here at or near the top of a window in the left rear door.

Nozzles 16 and 18 are pre-positioned to engulf or saturate a target region adjacent to door 22, with nozzle 16 oriented slightly inward and downwards and nozzle 18 oriented slightly downwards and outward so that the spray of the two nozzles might cooperate to partially intersect and over lap at a target region adjacent the door where an assailant might be standing. The positioning of the two nozzles also ensures that a fairly wide target area is covered by at least one of the nozzles so as to cover other all spots where the assailant might be.

FIG. 1 also shows an optional second pressurized canister 26 for the right side of the vehicle. Hoses 28, 32 lead from pressurized canister 26 to a set of multi directional nozzles 30, 34 by the right side passenger's door at the right side of the vehicle 10. It should be understood that these nozzles are arranged in a way that corresponds to nozzles 16 and 18 by the driver's door 22 on the left side of the vehicle, as previously described.

Figure 2:
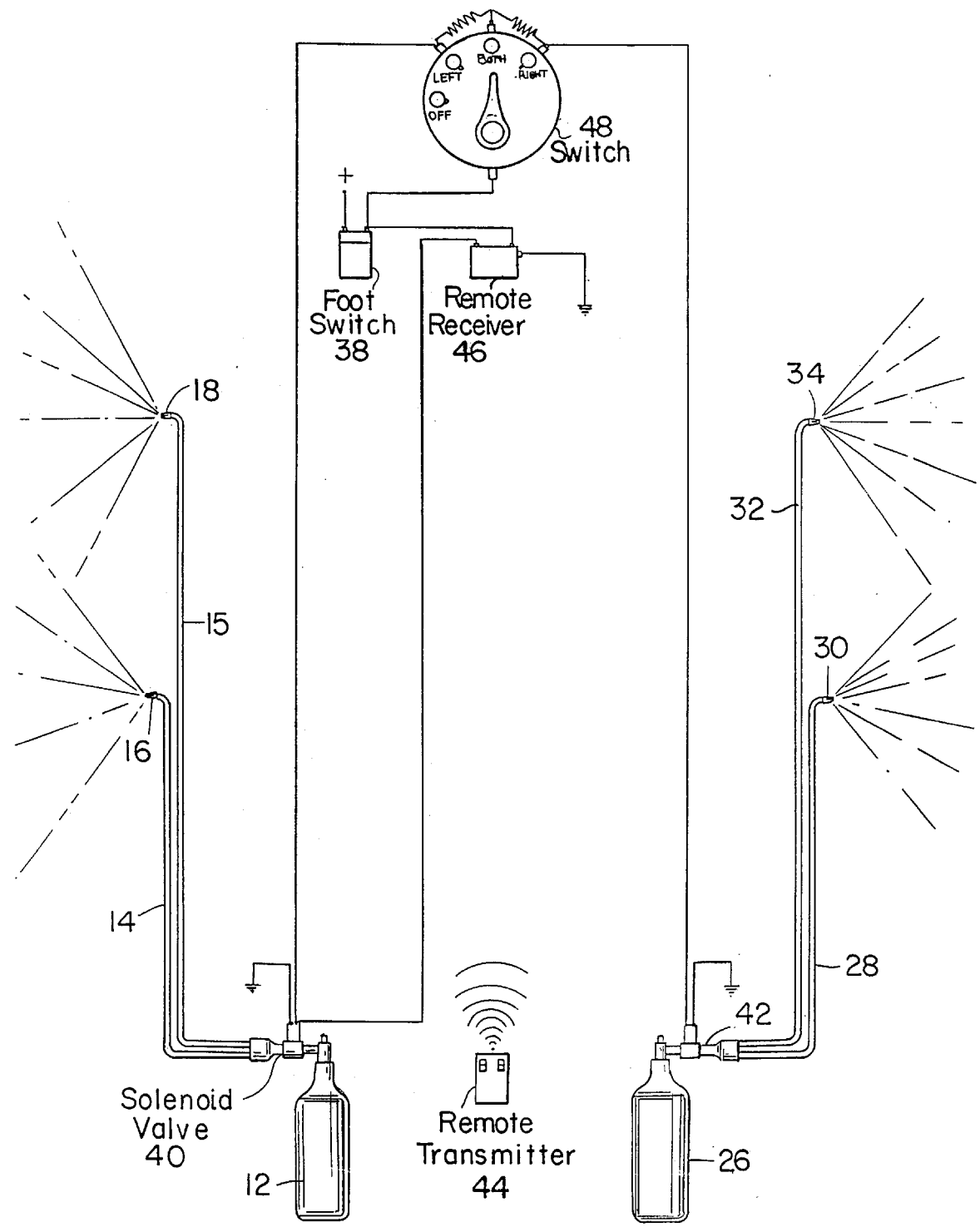
FIG. 2 is a schematic drawing of the installed system of this invention with two canisters.

The schematic view of FIG. 2 shows pressurized canister 12 and hose 14 leading to nozzle 16. As may be seen with reference to the figure, another hose 15 may lead to nozzle 18, and it may be understood that nozzles 16 and 18 serve the left side, or driver's door, of the vehicle. A second pressurized canister 26 is also shown, with hose 28 leading to nozzle 30, and hose 32 leading to nozzle 34. It will be understood that nozzles 30 and 34 serve the right side, or passenger's door, of the vehicle.

A foot trigger 38 transmits a current, when actuated, to solenoids 40 and 42. Solenoid 40 opens a valve permitting the contents of pressurized canister 12 to pass to nozzles 16 and 18. Solenoid 42 opens a valve permitting the contents of pressurized canister 26 to pass to nozzles 30 and 34. A remote trigger 44 includes a transmitter that is capable of sending a signal to remote receiver 46. When so actuated, remote receiver 46 opens solenoid valves 40 and 42. Foot trigger 38 draws power from the vehicle's battery (not separately shown), and remote trigger 44 draws power from its own battery.

An optional selector switch 48 may be provided. Selector switch 48 may be a four-way switch, with settings permitting the system of this invention to be turned off; on, left side only; on, right side only; on, both sides. As shown in FIG. 1, the selector switch 48 may be carried in the front of the car, drawing current from the fuse box 50. Canisters 12 and 26 may be carried in the rear, in the trunk of the car. An antenna 52, relay 54, and ground wire 56 and hot wire 58 are also shown. Wires 60, 62 connect to the solenoids (not separately numbered) controlling canisters 12 and 26.

Figure 3:
FIG. 3 is a perspective view of the embodiment of FIG. 1 showing the saturation of the target area and the effect upon an assailant.

FIG. 3 shows an assailant outside the left (driver's) door 22 of vehicle 10. The overlapping atomized material emitted from nozzles 16 and 18 cover the target region adjacent to the door where the assailant is standing. The emitted material disables the assailant, permitting the vehicle owner to avoid the danger. Hoses 14 and 15 are concealed under the door moldings and are not visible in FIG. 3.

Figure 4:
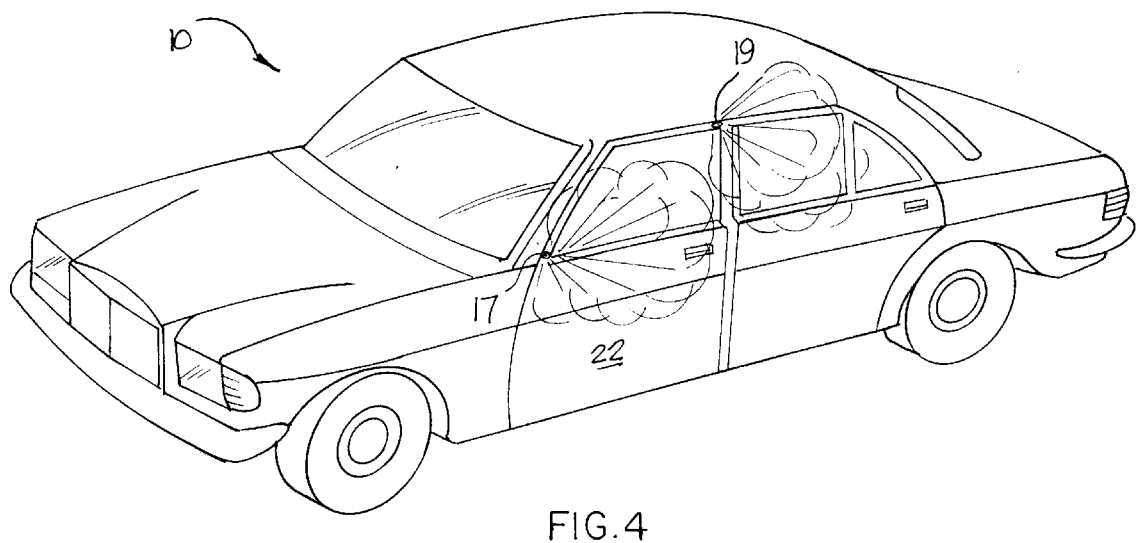
FIG. 4 is a perspective view of another embodiment of the system of this invention, showing nozzles near the lower left and upper right corners of a window.
Figure 5:
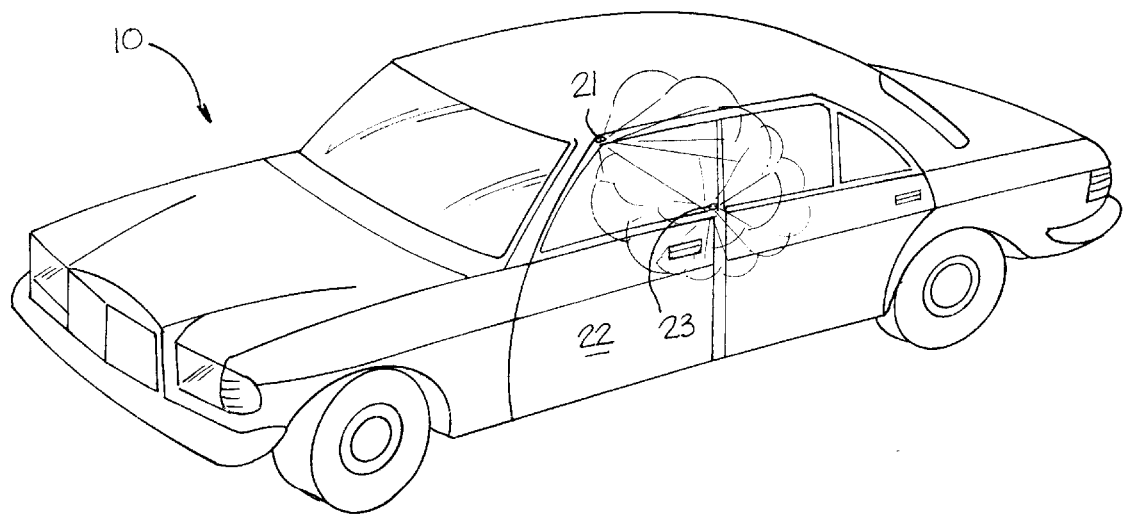
FIG. 5 is a perspective view of another embodiment of the system of this invention, showing nozzles near the upper left and lower right corners of a window.

Likewise, it should be understood that additional nozzles could be used in various other combinations. That is, nozzles could be placed, for example, at or near the lower left and upper right corners of a window (reference FIG. 4), at or near the upper left and lower right corners of a window (reference FIG. 5), or at or near all four corners (not separately shown, but well understood with reference to FIGS. 4 and 5 taken together). In the interest of simplicity and economy of installation, and except for vehicles of special dimensions in which the configuration of FIG. 1 presents a problem, a preferred arrangement is for the nozzles to be paired generally as suggested in FIG. 1.

As shown in FIG. 1, canisters may be located in the trunk, but it should be understood that canisters may also be located elsewhere, as, for example, in the passenger compartment, under the dashboard on the firewall, under the hood, or in a compartment in one of the doors. As shown in FIGS. 1 and 2, multiple canisters may be used and may be equipped with a simple selector switch 48 for selecting either or both of the canisters, or for turning the system off.

As is known in the art, and as described in U.S. Pat. No. 4,618,096 of Kondo et al., incorporated herein by this reference, the nozzles of this invention can be made to swivel under fluid pressure according to a self-fluidic swivel design to further cover a larger target area. Thus, the multi-directional, atomizing nozzles of the instant invention become able to cover a larger target area.

Figure 6:
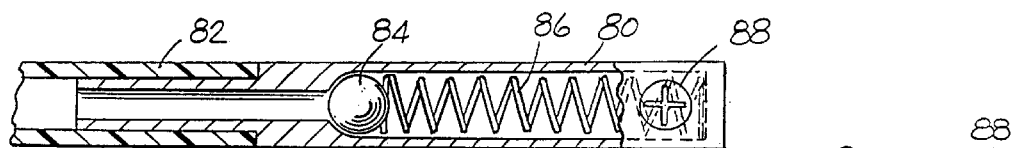
FIG. 6 is a plan view of a multi-directional nozzle assembly suitable for use in this invention.

FIG. 6 shows a nozzle assembly 80, for use with the installed system, in a friction seal with conduit tubing 82 which represents any of the hoses leading from a canister of this invention. A check ball 84 and spring 86 operate to provide a positive shut off: fluid pressure will push the ball against the spring, opening the assembly for fluid flow; when the fluid pressure is lessened, the spring will push the ball back to shut off the flow.

Figure 8:
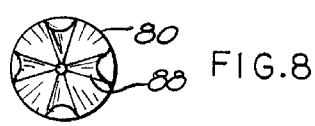
FIG. 8 is a front view of the multi-directional nozzle of FIG. 7.
Figure 7:
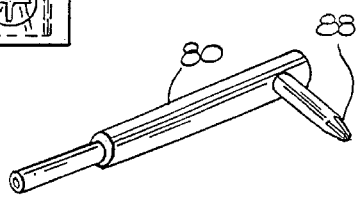
FIG. 7 is a perspective view of the nozzle assembly of FIG. 6.

With reference to FIGS. 6, 7 and 8, the multi-directional atomizing nozzle head 88 may be seen. A preferred nozzle head shape for securing a saturating, multi directional dispersion pattern of atomized material is a cross-shape, as shown in the Figures. Regardless of configuration, the canister size and the interior diameter of the hoses connecting the canisters to the nozzles is important to having the proper fluid volume and pressure for optimum spray dispersion and density. The inventors have found that the relative sizes and diameters vary with the location of the nozzles and canisters in a given make and model of car and that good results can be achieved with appropriate adjustments for any particular installation. In a test installation of the installed system, good results were obtained using nylon tubing with an interior diameter of 0.10 inch, nozzles with interior diameter of 0.10 inch, and a 12 inch canister holding 28 ounces of fluid at an initial pressure of 200 psi.

With reference to FIG. 9, it may be seen that the detachable system of this invention 90, fits a vehicle window 20 on a vehicle 10. As better seen in FIG. 10, the devise 90 consists of a pressurized canister 92 containing a disabling fluid, an adaptive head 94 containing a trigger devise (not shown), an inverted "u" shaped support clip which is unremovably anchored into the support lip 95 of adaptive head 94. As better seen in FIG. 11, the clip 96 contains embedded therein a fluid conveying channel 98 which connects the fluid dispensing adapter 100 on adaptive head 94 (see FIG. 10) and multi-directional, atomizing nozzle 188 as shown in FIG. 12. The nozzle 188 is of like design to nozzle 88 as shown in FIG. 8.

In another embodiment of the detachable system (not shown), the clip 96 can be elongated along its horizontal axis to accept two(2) nozzles 188 at either end thus providing an overlapping spray configuration as described for the installed system. In this embodiment embedded channel 98 is preferably "Y"ed to service both nozzles.

The system of this invention has been tested with a mixture of 10% oleoresin capsicum solution, 5% propylene glycol USP, 35% specially denatured alcohol 40B, and 50% distilled water. Of course, other nonlethal disabling formulations may be used.

According to the system of this invention, the canisters are pre-pressurized and are not dependent upon the vehicle's engine being on to drive a pump. The canisters of this invention may, however, be adopted for recharging as known in the art, and as shown, for example, in U.S. Pat. No. 2,114,558 of Dismukes, which is incorporated herein by this reference.

Moreover, the electrical current necessary to actuate the foot trigger and hand trigger in the installed system is provided independently of the ignition switch of the vehicle and so will operate even when the vehicle is not running. Thus, the trigger(s) can be actuated in a single step, and do not require the preliminary step of first turning on the ignition. The triggers are unobtrusive and the nozzles are predisposed so as to make the use of the system of this invention fast and without warning to the intruder.

The method of this invention includes positioning at least one atomizing, multidirectional nozzle adjacent a target area proximate the side of a vehicle; transporting a disabling fluid from a reservoir to the nozzle under sufficient force to enable the nozzle to emit an atomized spray of the fluid to the target zone. Preferably, the disabling fluid is transported by means of pressurizing a canister containing the fluid. Since the canister is already pressurized before the emergency occurs, there is no need to wait during the emergency situation for the pressure to be established. It should be noted that the pressure in the canister is maintained independently of the vehicle's engine, and that the device which transports the fluid is powered independently of the vehicle's ignition system so that the security system can be activated at any time and without regard to whether the vehicle is turned on, whether its engine is running, or the ignition is on.

Accordingly, it can be understood that this invention provides a system having the advantages of pre-positioned nozzles which emit a spray of disabling fluid to saturate a target area outside the vehicle; a rapid one-step trigger for actuating the system rapidly and unobtrusively; having pressure and power ready at all times so that the security system is immediately available.

The multi-directional saturating nozzles that can be used in accordance with this invention are generally those which provide a mushroom-shaped dispersion of a fluid in a multi-directional manner to provide an atomized, saturating "cloud" of material. The atomized material is in the form of very small droplets. It should be realized, in accordance with this invention, that the word "atomized" means tiny droplets of moisture which, because they are propelled multi-directionally from the nozzle, are air-borne a relatively short amount of time. It will be realized by the skilled artisan that nozzles which provide very fine mists may not be as preferred in that breezes or winds in the target area may disperse the material prior to its being effective. Therefore, nozzles which disperse small droplets of material sufficient to adhere to and be absorbed by animal tissue are preferred.

The incapacitating or disabling fluid can be, for example, tear gas or other such known materials, or liquids which can be atomized, such as pepper spray and substances available under the trademark "Mace®."

The propellants which can be used in accordance with the instant invention are nitrogen and such other inert, suitable gasses which will propel the fluid through a nozzle to atomize it. It will be realized by the skilled artisan that the fluid can be propelled by other than pressurized gas, such as by siphons, vibrating membranes, pumps and the like.

It will be further realized that the control means or circuit by which the installed system is actuated can include a lock-out switch which may be operated by either key or lock combination to immobilize the system on the vehicle in situations where children may play and accidently activate the system.

Triggering devices, especially for the detachable device, can be of known design. Preferably, the trigger employs a mechanical safety device which prevents the device from being discharged inadvertently. The preferred trigger device is one that, once depressed, continues to disperse fluid without further manipulation. This allows the occupant to have both hands free to effect a get-away.

What is claimed is:

1. A detachable vehicle security system for conveying a disabling fluid from interior a vehicle to a target area exterior the vehicle comprising:

(a) a detachable supporting bracket containing a U shaped channel for conveying a disabling fluid from the interior of the vehicle to the exterior of the vehicle;

(b) a multi-directional nozzle means for atomizing a disabling fluid, including at least one nozzle mounted on said bracket outside said vehicle and communicating with said channel;

(c) a reservoir means containing a disabling fluid on the interior of said vehicle, communicating with said channel;

(d) means for delivering a selective quantity of said fluid from said reservoir to said nozzle through said channel such that said target area is saturated with said disabling fluid.

2. The system of claim 1 wherein said detachable supporting bracket is adapted to fit over a closed vehicle window.

3. The system of claim 2 wherein said reservoir is a pressurized canister supported on said detachable supporting bracket and communicating with said channel.

4. The system of claim 3 wherein said means for delivering said selective quantity of said fluid includes a valve which, when actuated, remains open.

5. The system of claim 1 wherein said nozzle means comprises at least two multi-directional nozzles in cooperation to emit an overlapping spray pattern of said disabling fluid to said target area.

* * * * *